Dec. 19, 1967   F. E. BUSCHBOM   3,358,814
BUNK FEEDER OR THE LIKE
Original Filed June 8, 1962   2 Sheets-Sheet 1

INVENTOR.
FLOYD E. BUSCHBOM
BY
Braddock & Burd
ATTORNEYS

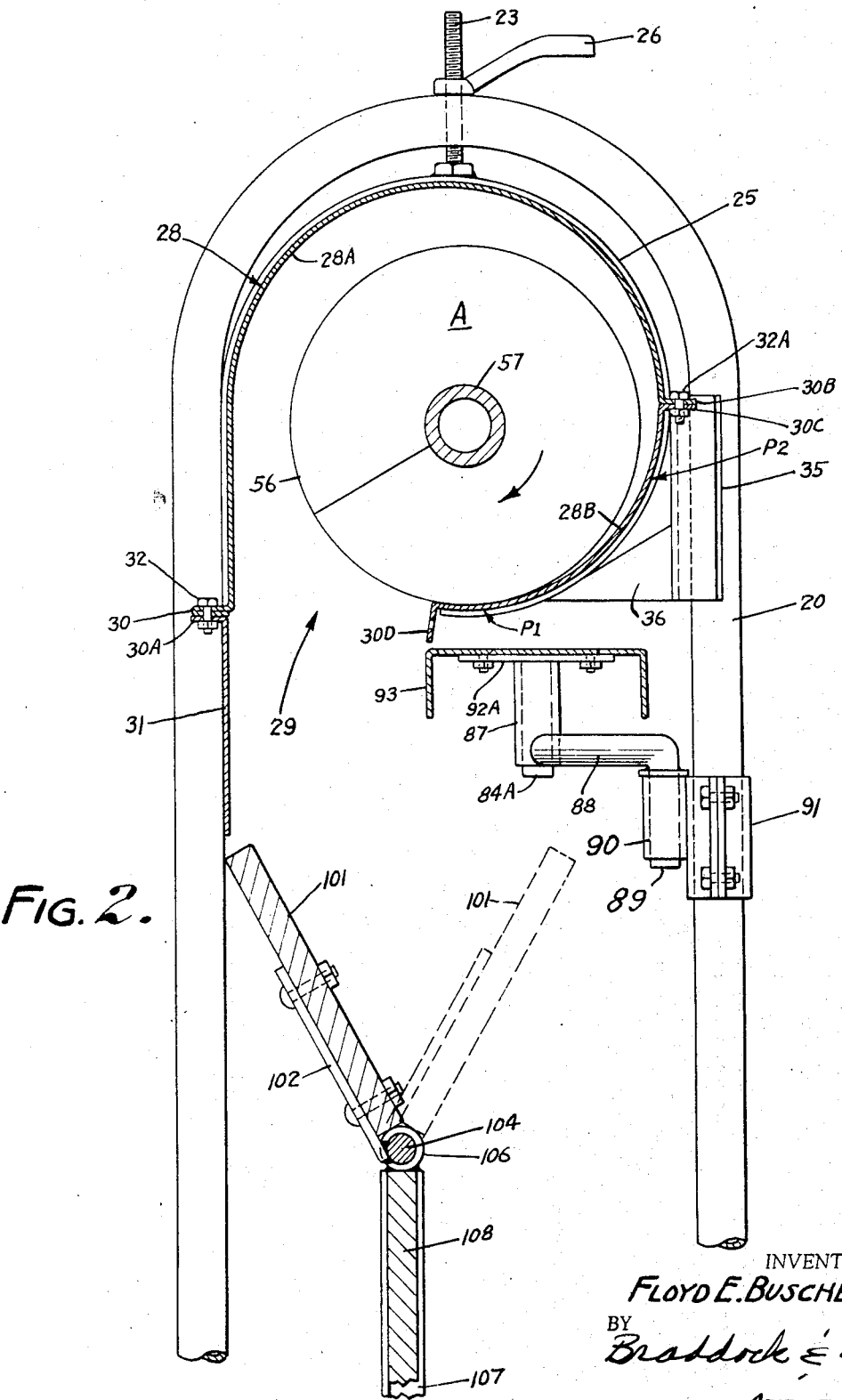

United States Patent Office 3,358,814
Patented Dec. 19, 1967

3,358,814
BUNK FEEDER OR THE LIKE
Floyd E. Buschbom, Long Lake, Minn., assignor to Vandale Corporation, Long Lake, Minn., a corporation of Minnesota
Application Mar. 24, 1965, Ser. No. 442,434, now Patent No. 3,303,966, dated Feb. 14, 1967, which is a division of application Ser. No. 201,052, June 8, 1962, now Patent No. 3,254,798, dated June 7, 1966. Divided and this application Sept. 1, 1966, Ser. No. 576,639
10 Claims. (Cl. 198—213)

ABSTRACT OF THE DISCLOSURE

A bunk feeder having a J-shaped wall spaced from an upright wall defining an elongated slot closed with an elongated gate. A plurality of arms support the gate for movement to open and closed positions relative to the slot to either store the feed in the slot or dump a ribbon of feed into a feed bunk. A power driven auger located in the curved part of the J-shaped wall carries feed from a hopper into the slot. The curved part of the J-shaped wall is removably mounted on the upper part of the wall and can be reversed in end-for-end positions. The auger has a curvature smaller than the wear plate so that only a linear portion of the wear plate adjacent the discharge edge is subjected to the wear of the auger. An upright divider member located under the gate carries an angularly movable feed diverter board.

*Cross reference to related applications*

Figure 1:
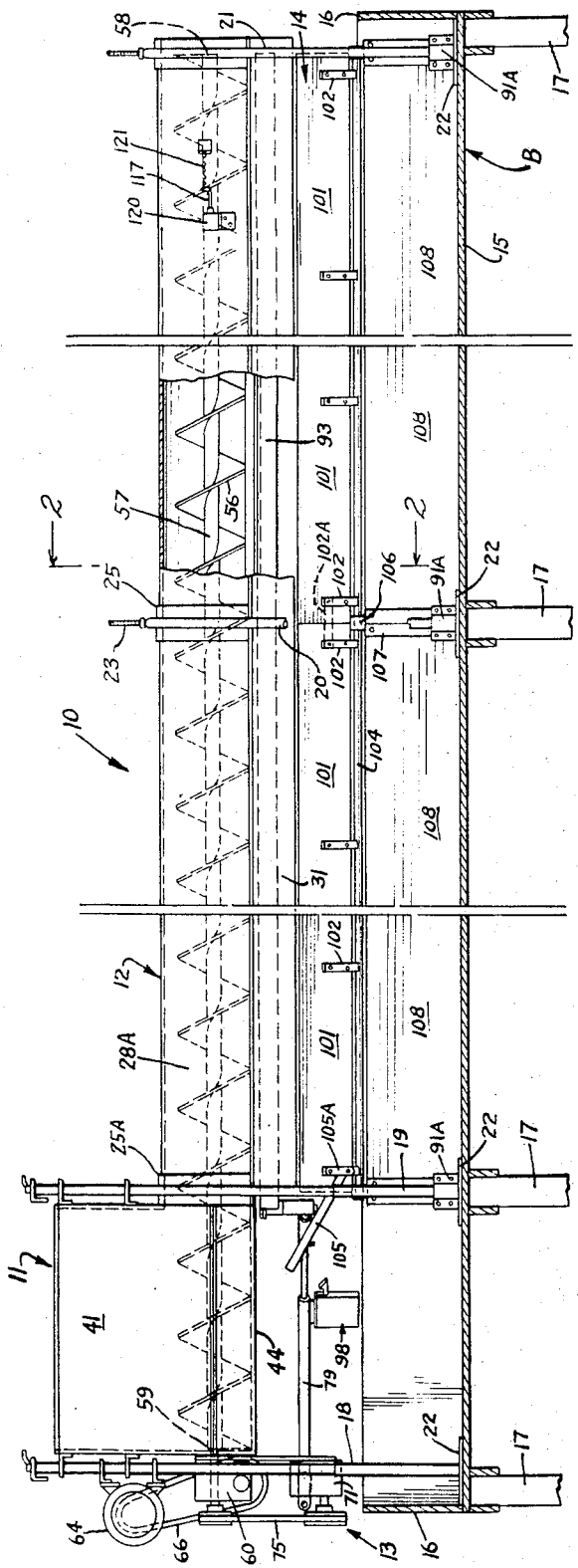

This application is a division of Ser. No. 442,434 filed Mar. 24, 1965 now U.S. Patent No. 3,303,966. Ser. No. 442,434 is a division of Ser. No. 201,052 filed June 8, 1962 now U.S. Patent No. 3,254,798.

*Summary of invention*

Briefly described, the invention relates to a reversible wear means for a bunk feeding apparatus having an elongated support member and an elongated helical conveying means located adjacent and generally parallel to the elongated support member. The reversible wear means includes an elongated wear plate means having opposite edges and an arcuate cross section of a concave curvature larger than the arcuate peripheral curvature of the helical conveying means. When the wear means is assembled on the bunk feeder the conveying means only engages a longitudinal portion of the wear plate means limiting the wear to this longitudinal portion. The wear plate means can be reversibly attached to the support member to selectively mount it in end-for-end positions. The helical conveying means being smaller than the curvature of the wear plate will only selectively engage opposite linear portions of the wear plate means and thereby increase the useful life of the wear plate means.

In the drawings:

FIGURE 1 is a side elevational view, partly broken away, of the invention installed in a feed bunk, the feed bunk having the closer side rail removed, and being shown in fragmentary form; and FIGURE 2 is an enlarged fragmentary vertical sectional view taken along the line 2—2 of FIGURE 1 showing the gate in position for dropping feed.

Reference is now made to the drawings and specifically to FIGURE 1. There is shown the bunk feeder or the like of this invention generally designated 10, including the following generally designated components: the hopper assembly 11, the conveyor assembly 12, the drive assembly 13 and the tiltboard assembly 14. All of these are positioned in the bunk B which is supported by a plurality of legs 17 secured to and supporting a floor or base 15 having a peripheral wall 16, the nearest portion of which is removed for illustration. The bunk B is usually made of wood, although it may be constructed partially or completely of concrete, steel or the like, as desired. The entire feeder 10 is supported on a plurality of support stands 18–21, each of which provides a pair of legs having flat foot plates or flanges 22 which are bolted or otherwise secured to and which rest on and are supported by the floor 15 of the bunk.

Each of the stands 20–21 is identical, comprising a pair of spaced parallel tubular legs interposed by a semicircular portion integral therewith as shown in FIGURE 2. They are thus of inverted U-configuration and formed from a tubular or pipe member, as shown. Each is apertured at the bend in the U to receive a threaded bolt or adjusting rod 23 having its head welded or otherwise secured to a hanger bracket and carry over plate 25 of the form shown in FIGURE 3. A handle 26 has an apertured end providing a nut which is threaded onto member 23, all as will be seen by reference to FIGURES 2 and 3. By turning the handle 26 the rod 23 may be raised or lowered with respect to the U portion of member 20 and thus the entire tube assembly 12 elevated or lowered by turning all of the handles substantially uniformly.

The conveyor assembly 12 includes an elongated housing shroud or hood 28 which is formed of three parts, upper support member or cover 28A, a reversible member shown as bottom wall or wear plate 28B, and curtain wall plate or member 31. Members 28A and 28B and 31 are formed of suitably gauge sheet metal and when assembled form an inverted J in cross-section with an elongated aperture or slot at 29.

Member 28A is hemmed as shown in FIGURE 2 at 30 to provide an outwardly turned flange, to which is secured the outwardly turned flange 30A of curtain wall plate or member 31. The other edge of member 28A is bent to provide an outwardly turned flange 30B to which is secured one outwardly turned flange 30C of member 28B.

Member 28B comprises an elongated member having a cross-section in the form of an arc of a circle with two outwardly turned parallel flanges 30C and 30D at the longitudinal edges. The arc is uniform so that if there is wear due to the abrasive action of auger A thereagainst at the bottom portion indicated by P1, member 28B may be turned end-for-end or reversed whereupon portion P2 would then be positioned under auger A for support.

Wear plate 28B has an arcuate cross-section of a concave curvature substantially larger than the arcuate peripheral curvature of auger A. In use, auger A is entirely supported on a linear portion of the wear plate located adjacent the lower or discharge edge of the wear plate.

While flange 30 is shown as hemmed to provide a double fold, the flanges at 30A–30D are shown as single fold, although they may be hemmed to provide additional strength, if desired. Each of the outwardly turned flanges 30B–30D and 30–30A is provided with a plurality of aligned apertures so that curtain plate 31 may be bolted to member 28A by a plurality of bolt assemblies 32 and hood cover 28A may be bolted to wear plate 28B by a plurality of bolt assemblies 32A. Apertures in flanges 30C and 30D correspond to the apertures in flange 30B so that when the wear plate 28B is reversed the other flange (in this instance 30D) may be bolted to flange 30B.

Each of the flanges 30–30D have portions removed adjacent the ends thereof to accommodate the plate 25 which overlaps the butted juncture of adjacent sections of hood 28 of the tube assembly 12 as shown in FIGURE 1 and is bolted or otherwise suitably secured thereto at each side of the butt.

Thus, the entire bunk feeder assembly is comprised of a hopper and drive assembly and added on conveyor sections, each including hood, auger and closure, and tiltboard and diverter board sections. While only one conveyor section may be used, additional sections of uniform or varying length are usually used to provide the desired extension.

In this fashion the conveyor assembly tube or hood 28 comprises a plurality of sections, each section formed of the three members 28A, 28B and 31, all bolted together and each section being abutted at at least one end to an adjoining section, or to the hopper assembly 11, and positioned in abutment by the overlapping reinforcing plate 25 bolted thereto. Plate 25 has welded to it throughout the portion designed to support the wear plate 28B, a guide member 35 in a form of a section of angle which is adapted to abut against and ride up and down the adjacent leg of stand 21. A gusset 36 serves to support in position the bottom end of member 25 and is welded to member 35 as shown in FIGURE 2.

The material conveying unit, auger or helical flight means A supported by the wear plates 28B and hopper bottom 44, comprises a plurality of auger sections each comprising a helical flight 56 secured to a tubular center shaft 57. Adjacent sections are abutted together and joined in any suitable manner such as by having adjoining ends of shaft 57 sleeved over a common stub shaft or rod and pinned thereto, or otherwise. Auger A is provided with a distal terminal end 58 and a proximal terminal end 59, as shown in FIGURE 1. End 59 has one end of output shaft 62 of a gear box or transmission 60 positioned therein and pinned or otherwise secured thereto so that the auger A is rotated by the gear box or transmission 60. Motor 64 is used to drive belt 66 coupled to gear box 60. A second gear box 71 mounted on stand 18 is drivably connected to gear box 60 with belt 75. Gear box 71 operates to reciprocate pitman arm 79 connected through solenoid assembly 78 to a gate or closure member 93.

Shaft 84A is secured to a plate member 92A, in turn bolted or secured to the underside of a gate or closure member 93. A sleeve 87 secured to an arm 88 is telescoped over shaft 84A. Arm 88 has a down turned end 89 supported for arcuate movement by sleeve 90 of bracket assembly 91. Bracket assembly 91 is made in two hemimorphic portions positioned around one of the legs of stand 20. Closure member 93 is an elongated rectangular plate member having downwardly turned edges which may be hemmed for additional strength as desired. A plurality of gate members 93 are usually provided, one for each section of hood and auger since a plurality of hood and auger sections is usually used, as previously described. Closure members 93 are then positioned end-to-end and in abutment and supported by plates 92A being positioned to underlay each of the abutting ends. Since there is no abutment for the first and last members 93, plate 92 at the hopper end, and plate 92A at the distal end (of the closure means formed by the plurality of members 93 in end-to-end relation) are each placed flush with the edge of their respective members 93.

Plates 92A are each provided with a shorter shaft 84A as shown for plate 92A in FIGURE 2, than plate 92 since the shaft 84A does not need to penetrate sleeve 83 as does shaft 84 of plate 92 when it is connected to the pitman. Both plates 92 and 92A are supported by arms 88 and brackets 91.

The tiltboard assembly illustrated in FIGURES 1 and 2 comprises a plurality of tiltboard sections 101 each bolted to a bracket strap 102, usually two straps being used for each board. Adjacent straps at abutting ends of boards 101 are joined by straps 102A so that all boards tilt in unison. Straps 102 are each welded at one end to tubular rod 104. Board 101 adjacent end 69 is provided with a handle 105, as shown in FIGURE 1, and either on opposite male or female end. Handle 105 has a tubular portion joined at one end to a flat piece 105A, at an angle, piece 105A being bolted to the first bracket strap 102. Rods 104 are straight and each has a short protruding shaft welded in one end to make one male and one female end for positioning in cooperating prolongation and are received in a plurality of sleeves 106 each supported at the top of a divider board bracket 107 which also serves to support adjacent ends of the divider boards 108 which are positioned in abutment and prolongation as shown in FIGURE 1. Rods 104 are so chosen that when in the assembled position of FIGURE 1, abutting ends are received within sleeves 106. Bracket 107 is bolted to the end of boards 108. Bracket 107 comprises a T member secured at its bottom end to a rod or pipe 109 which has an upturned end received in the sleeve of a securing bracket assembly 91A. Assembly 91A for bracket 107 is bolted to clamp on one of the tubular legs of stands 19–21, and adjacent foot 22, but otherwise similarly to bracket 91 for arms 88.

It will be apparent by reference to FIGURE 2 that the auger A is rotated in a direction to roll up the arcuate incline provided by the arcuate wear plates 28B, or clockwise with reference to FIGURE 2. Cover 28A and plate 28B provide in cross-section, a circle for the major portion of their combined peripheries. The circle is terminated at flange 30D and by a portion of cover 28A providing a straight edge portion joined to the curtain wall 31. The straight edge portion commences at a point substantially on a horizontal plane passed through the axis of auger A as seen by reference to FIGURE 2. The axis of auger A is offset downwardly and rightwardly with reference to the axis of the circular formed by portions 28A and 28B so that wear plate 28B cradles the auger as shown. The straight portion of cover 28A terminates in spaced relation to flange 30D to provide the opening 29.

Hence, there is a gradually increasing clearance between the circumference of auger A and the circle formed by members 28A and 28B, the clearance gradually increasing upwardly in a counter-clockwise direction as shown in FIGURE 2. The edge of wear plate 28B at flange 30D is positioned at slightly past a vertical plane passed through the axis of the circle to cradle the auger A when it is in the position shown. In other words, that edge of the wear plate (as at 30D) is positioned at one side also of a vertical plane passed through the axis of auger A when it is at rest position, but immediately adjacent that plane. The increasing clearance provided not only allows for give or freedom of the auger within the housing 28 when bunches of material or other obstructions are encountered, but also provides a space occupied by the material F for carrying of material over plates 93 as shown in FIGURE 2. Thus the space provides a trough of the cross-sectional configuration shown.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A reversible wear means for a bunk feeding apparatus having an elongated support member, an elongated helical conveying means located adjacent and generally parallel to the elongated support member, said conveying means movable about an axis comprising: an elongated wear means having longitudinal edges, a first linear portion along one edge and a second linear portion along the other edge, said second linear portion being spaced from the first linear portion, and an arcuate cross-section of a concave curvature substantially larger than the arcuate peripheral curvature of the helical conveying means so that the conveying means only engages one of the linear portions, the center axis of the arcuate curvature of the wear means located along a line generally parallel to and offset upwardly and outwardly from the axis of the conveying means, and means for attaching said elongated wear means to the elongated support member selectively in initial or end-for-end reverse position whereby the bottom portion of the helical conveying means selectively engages only one of said linear portions of the wear means.

2. The reversible wear means defined in claim 1 wherein said means for attaching said reversible wear means to the elongated support member includes outwardly directed longitudinal flanges at both longitudinal edges of the wear plate means.

3. The reversible wear means defined in claim 1 wherein the elongated support member includes a member having an outwardly directed flange, and said means for attaching said wear means to the support member includes an outwardly directed flange projected from the wear means and fastening means for securing the flanges together.

4. The reversible wear means defined in claim 1 wherein said elongated wear means is an elongated concave curved plate plate outwardly directed flanges at both edges.

5. In a bunk feeding apparatus the improvement of: an elongated support member, an elongated helical conveying means located adjacent and generally parallel to the elongated support member, said converging means rotatable about an axis, an elongated reversible wear plate for supporting a bottom portion of said helical conveying means, said wear plate having longitudinal linear edges, a first linear portion along one edge and a second linear portion along the other edge, said second linear portion being spaced from the first linear portion and an arcuate cross-section of a concave curvature substantially larger than the arcuate peripheral curvature of the helical conveying means so that the conveying means only engages one of the linear portions, the center axis of the arcuate curvature of the wear plate means located along a line generally parallel to and offset upwardly and outwardly from said axis away from the linear portions supporting the conveying means, and means for attaching said reversible wear plate to the elongated support member selectively in an initial or end-for-end reverse position whereby the bottom portion of the helical conveying means selectively engages only one of said linear portions of the wear plate.

6. The apparatus defined in claim 5 including a downwardly directed side plate laterally spaced from the lower edge of said wear plate.

7. The apparatus defined in claim 5 wherein said elongated support member includes a hood means extended over said elongated helical conveying means.

8. The reversible wear means defined in claim 5 wherein said means for attaching said reversible wear plate to the elongated support member includes outwardly directed longitudinal flanges at both longitudinal edges of the wear plate.

9. The reversible wear means defined in claim 5 wherein the elongated support member includes a member having an outwardly directed flange, and said means for attaching said wear plate to the support member includes an outwardly directed flange projected from the wear plate and fastening means for securing the flanges together.

10. The reversible wear means defined in claim 5 wherein said wear plate is an elongated concave curved plate having outwardly directed flanges at both edges.

References Cited
UNITED STATES PATENTS 3,103,913   9/1963   Sime _____ 198—64

RICHARD E. AEGERTER, *Primary Examiner.*